US009168511B2

(12) United States Patent
Pieterse

(10) Patent No.: US 9,168,511 B2
(45) Date of Patent: Oct. 27, 2015

(54) CATALYST FOR HYDROGEN PRODUCTION
(75) Inventor: Johannis Alouisius Zacharias Pieterse, Alkmaar (NL)
(73) Assignee: Stichting Energieonderzoek Centrum Nederland, Petten (NL)
(*) Notice: Subject to any disclaimer, the term of this patent is extended or adjusted under 35 U.S.C. 154(b) by 180 days.
(21) Appl. No.: 13/885,636
(22) PCT Filed: Nov. 15, 2011
(86) PCT No.: PCT/NL2011/050780
§ 371 (c)(1),
(2), (4) Date: Aug. 5, 2013
(87) PCT Pub. No.: WO2012/067505
PCT Pub. Date: May 24, 2012
(65) Prior Publication Data
US 2013/0302241 A1    Nov. 14, 2013
(30) Foreign Application Priority Data
Nov. 16, 2010 (NL) ........................... 2005700
Mar. 14, 2011 (NL) ........................... 2006383
(51) Int. Cl.
*B01J 21/02* (2006.01)
*B01J 21/04* (2006.01)
(Continued)
(52) U.S. Cl.
CPC .............. *B01J 23/8946* (2013.01); *B01J 21/02* (2013.01); *B01J 21/10* (2013.01); *B01J 23/005* (2013.01);
(Continued)
(58) Field of Classification Search
CPC .......... B01J 21/02; B01J 21/04; B01J 21/063; B01J 21/066; B01J 21/10; B01J 23/26; B01J 23/34; B01J 23/462; B01J 23/745; B01J 23/862; B01J 23/8892; B01J 35/006; B01J 37/00; B01J 37/0018; B01J 37/08; B01J 37/16; C01B 3/26
USPC ......... 502/202, 204–207, 305, 306, 309, 315, 502/320–324, 340, 341, 346, 350, 351, 354, 502/355; 423/654
See application file for complete search history.

(56) References Cited

U.S. PATENT DOCUMENTS 3,114,697 A * 12/1963 Bourne et al. ................. 208/136
3,533,963 A * 10/1970 Gignier et al. ................. 502/306
(Continued)

FOREIGN PATENT DOCUMENTS

GB          1 283 780 A      8/1972
WO    WO-2004/000456 A2   12/2003
(Continued)

OTHER PUBLICATIONS

Morris, Stacy M. et al., "Ordered Mesoporous Alumina-Supported Metal Oxides," Journal of the American Chemical Society, vol. 130, No. 45, Nov. 12, 2008, pp. 15210-15216.
(Continued)

*Primary Examiner* — Patricia L Hailey
(74) *Attorney, Agent, or Firm* — Gilberto M. Villacorta; Sunit Talapatra; Foley & Lardner LLP

(57) ABSTRACT

The invention provides a catalyst for the production of hydrogen by steam reforming. The catalyst is a porous catalyst which is based on at least aluminum oxide and preferably magnesium oxide, and further comprises boron and nickel. The porous catalyst comprises pores having an average pore size in the range of 0.1-50 nm. The activity of the catalyst may be further enhanced by addition of a noble metal such as Rh, Ru, Pd, Ir or Pt. The catalyst can be broadly used in hydrogen production processes, and is especially suitable for reforming using a membrane which is selective for a predetermined reaction product. Such process can be operated at relatively low temperatures of about 450-700° C.

23 Claims, 3 Drawing Sheets

(51) Int. Cl.

| | |
|---|---|
| *B01J 21/10* | (2006.01) |
| *B01J 23/26* | (2006.01) |
| *B01J 23/34* | (2006.01) |
| *B01J 23/745* | (2006.01) |
| *B01J 37/00* | (2006.01) |
| *B01J 37/08* | (2006.01) |
| *B01J 37/16* | (2006.01) |
| *C01B 3/26* | (2006.01) |
| *B01J 23/89* | (2006.01) |
| *B01J 23/00* | (2006.01) |
| *B01J 23/755* | (2006.01) |
| *B01J 37/03* | (2006.01) |
| *B01J 23/78* | (2006.01) |
| *B01J 23/83* | (2006.01) |
| *B01J 23/835* | (2006.01) |
| *C01B 3/40* | (2006.01) |
| *C01B 3/50* | (2006.01) |

(52) U.S. Cl.
CPC ............... *B01J 23/755* (2013.01); *B01J 23/78* (2013.01); *B01J 23/83* (2013.01); *B01J 23/835* (2013.01); *B01J 37/033* (2013.01); *B01J 37/036* (2013.01); *B01J 37/084* (2013.01); *C01B 3/40* (2013.01); *C01B 3/50* (2013.01); *C01B 3/501* (2013.01); *C01B 2203/0233* (2013.01); *C01B 2203/0238* (2013.01); *C01B 2203/0283* (2013.01); *C01B 2203/041* (2013.01); *C01B 2203/047* (2013.01); *C01B 2203/0425* (2013.01); *C01B 2203/0475* (2013.01); *C01B 2203/107* (2013.01); *C01B 2203/1041* (2013.01); *C01B 2203/1047* (2013.01); *C01B 2203/1052* (2013.01); *C01B 2203/1064* (2013.01); *C01B 2203/1058* (2013.01); *C01B 2203/1076* (2013.01); *C01B 2203/1082* (2013.01); *C01B 2203/1094* (2013.01); *C01B 2203/1217* (2013.01); *C01B 2203/1241* (2013.01); *C01B 2203/1247* (2013.01); *C01B 2203/1619* (2013.01)

(56) References Cited

U.S. PATENT DOCUMENTS

| | | | | |
|---|---|---|---|---|
| 3,840,471 | A | * | 10/1974 | Acres ............................. 502/177 |
| 4,207,211 | A | * | 6/1980 | Russ et al. ..................... 502/324 |
| 4,331,544 | A | * | 5/1982 | Takaya et al. ................. 502/177 |
| 5,399,537 | A | | 3/1995 | Bhattacharyya et al. |
| 6,416,731 | B1 | | 7/2002 | Dohrup et al. |
| 8,575,063 | B2 | * | 11/2013 | Xu et al. ........................ 502/335 |
| 2004/0054016 | A1 | | 3/2004 | Lu et al. |

FOREIGN PATENT DOCUMENTS

| | | |
|---|---|---|
| WO | WO-2006/114682 A2 | 11/2006 |
| WO | WO-2008/049266 A1 | 5/2008 |

OTHER PUBLICATIONS

PCT International Search Report dated Jul. 5, 2012 issued in PCT/NL2011/050780.

* cited by examiner

US 9,168,511 B2

CATALYST FOR HYDROGEN PRODUCTION

CROSS-REFERENCE TO RELATED APPLICATIONS

This application is the National Phase of International Patent Application No. PCT/NL2011/050780, filed Nov. 15, 2011, published as WO 2012/067505, which claims priority to Nederland Application Nos. 2005700, filed Nov. 16, 2010 and 2006383, filed Mar. 14, 2011. The contents of these applications are herein incorporated by reference in their entirety.

FIELD OF THE INVENTION

The invention relates to a catalyst for use in a catalytic process for the production of hydrogen, especially a reforming process, a porous catalyst that can be used in such process, as well as to a process for the production of such porous catalyst per se.

BACKGROUND OF THE INVENTION

The use of nickel catalysts in steam reforming of hydrocarbons is known in the art. U.S. Pat. No. 6,416,731, for instance, describes a process for catalytic steam reforming of a carbonaceous feedstock with improved resistance to sulphur poisoning and sintering characterized by contacting the feedstock with a nickel catalyst supported on magnesium aluminium spinel, $MgO.xAl_2O_3$, wherein the spinel support has a specific surface area $A_{sp}[m^2/g]$ higher than $400*exp(-T_c/400°\, C.)$ obtained by calcination at a temperature $T_c\,[°\,C.]$.

WO2008/049266 describes a process for the conversion of hydrocarbons to hydrogen and one or more oxides of carbon, comprising contacting the hydrocarbon with steam and/or oxygen in the presence of a spinel-phase crystalline catalyst comprising a catalytically active metal. It also describes a method for making a catalyst suitable for the conversion of hydrocarbons to hydrogen and one or more oxides of carbon comprising adding a precipitant to a solution or suspension of a refractory oxide or precursor thereof and a catalyst metal-containing compound to form a precipitate which is calcined in an oxygen-containing atmosphere to produce a crystalline phase with a high dispersion of catalyst metal. There is further described a crystalline catalyst comprising the elements nickel, magnesium, aluminium and a lanthanide element, in which the crystalline phase is a spinel phase.

The catalytic conditions for (oxidative) steam reforming in combination with a membrane and/or a sorbent separator may substantially deviate from usual conditions in industrial hydrogen and/or syngas production (without such separator). When applying separation-enhanced processes, wherein the endothermal reaction may be promoted by separation of an endothermal reaction product, the general working temperature is lower than the usual conditions in industrial hydrogen and/or syngas production. This generates a desire to provide alternative catalysts that may be thermally activated at lower temperatures. Often, the stability of the catalyst in hydrogen-lean and hydrocarbon-rich conditions may favour the formation of carbon-rich deposits (e.g. graphite, graphene, soot and the likes) that may act as catalyst poison. Also this generates a desire to provide alternative catalysts that are more stable under such conditions.

In general, the catalyst for steam reforming of hydrocarbons to provide hydrogen and/or syngas on an industrial scale is preferably nickel (Ni) based. In some of the present applications, however, nickel appeared to be unstable and/or not reactive enough. Alternatively, noble metals may be applied, but those are more expensive, which may be less desired.

SUMMARY OF THE INVENTION

Hence, it is an aspect of the invention to provide an alternative catalyst for hydrogen formation (including syngas formation) via steam reforming, which at least partly obviates one or more of above-described drawbacks. Such a catalyst can be used in the entire broad temperature regime that applies to various configurations for steam reforming (e.g., low temperature reforming in general including convection reforming and reforming of bio-oil (components), pre-reforming, high temperature primary reforming etc.). The catalyst is especially suitable for application in separation-enhanced steam reforming.

It is further an aspect of the invention to provide an alternative hydrogen production process (including syngas formation), especially a separation-enhanced process. It is yet a further aspect of the invention, to provide a catalyst with high catalytic activity and stability, even at separation enhanced separation conditions, which may especially be used in the process of the invention.

To this end, the invention provides a catalyst comprising Ni, B, and Mg for the production of hydrogen ($H_2$) and syngas, especially for catalytic (oxidative) steam reforming of a hydrocarbon-containing gas (such as methane, natural gas, etc.), especially applied in combination with a separator which is selective for a predetermined reaction product, such as $CO_2$, for instance by means of a membrane selective for $CO_2$. In an embodiment, alternatively, the optional separator is selective for a predetermined reaction product, such as $H_2$, for instance by means of a membrane selective for $H_2$.

The catalyst is a porous catalyst, especially having pores with pore sizes in the range of 0.1-50 nm, especially 0.1-30 nm, such as 0.1-20 nm, even more especially 4-30 nm, such as 5-15 nm or 4-8 nm.

DETAILED DESCRIPTION

In a first aspect, the invention provides a porous catalyst based on at least aluminium oxide and one or more of magnesium, calcium, titanum, zirconium, chromiu, manganese and iron oxide, preferably magnesium oxide, wherein the porous catalyst further comprises boron and nickel, and wherein the porous catalyst comprises pores having an average pore size in the range of 0.1-50 nm, especially 0.1-30 nm, such as 0.1-20 nm, even more especially 4-30 nm, such as 5-15 nm. The catalyst comprising pores is herein further indicated as "porous catalyst" or "catalyst".

In a further aspect, the invention provides a process for the production of hydrogen ($H_2$) comprising subjecting a hydrocarbon-containing gas in a reaction chamber to a reforming reaction in the presence of a catalyst, and optionally in the presence of separator selective for a predetermined reaction product of the reforming reaction, such as a membrane selective for a predetermined reaction product of the reforming reaction, to produce a hydrogen-containing gas, wherein the catalyst is preferably porous, and is based on at least magnesium oxide and aluminium oxide, wherein the catalyst further comprises boron and nickel, and wherein the catalyst preferably comprises pores having a pore size in the range of 0.1-50 nm.

In a specific embodiment, wherein the separator is applied, the process may further comprise selectively removing at least part of the predetermined reaction product from the reaction chamber via the separator. Hence, in a specific embodiment, the invention provides a process for the production of hydrogen, comprising subjecting a hydrocarbon-containing gas in a reaction chamber to a reforming reaction in the presence of a catalyst and a membrane (as "separator"), selective for a predetermined reaction product of the reforming reaction, to produce a hydrogen-containing gas and selectively removing at least part of the predetermined reaction product from the reaction chamber via the membrane, wherein the catalyst comprises a, preferably porous, catalyst as defined above and below.

An advantage of this process, concomitant with the use of this catalyst, is that the reaction temperature can be lower, such as about 400-750° C., like 500-700° C., whereas the catalyst of the invention may be as efficient as state of the art catalysts which may have working temperatures at about 850-1000° C. It surprisingly appears that the catalyst both reduces carbon formation (on Ni) and maintains the desire catalyst (particle) size assumedly by confinement effects in pores of the support. Further, the presence of Mg has a positive effect on catalyst performance and stability, and helps to prevent formation of undesired spinel crystals.

In the absence of the separator, such as a selective membrane, the process conditions may include a temperature of over 700° C., such as about 850-1000° C., especially about 900-1000° C. Also under these conditions the catalyst of the invention may show its advantages with respect to stability. Hence, the invention also includes subjecting a hydrocarbon-containing gas in a reaction chamber to a reforming reaction in the presence of a catalyst as described herein, at a temperature in the range of 700-1000° C., especially 850-1000° C. (in the absence of a separator, such as a selective membrane).

Herein, the term "hydrocarbon-containing gas" refers to a gas that comprises one or more types of hydrocarbons. For instance, the hydrocarbon-containing gas may comprise or consist of natural gas, i.e. contain methane. However, the hydrocarbon-containing gas may also comprise one or more higher hydrocarbons, such as ethane or propane or biomass-derived (pyroligneous) oils. The gas may also comprise one or more unsaturated hydrocarbons and the oxygenates (derived from) alcohols, ethers and/or acids, esters aldehydes, ketones etc. Moreover, the gas may contain one or more (organo-)sulfur compounds. Especially, the hydrocarbon-containing gas comprises methane ($CH_4$).

The hydrocarbon-containing gas is subjected to a reforming reaction. This implies that the hydrocarbon-containing gas is mixed with water vapour (steam). In another embodiment, wherein $CO_2$ reforming is applied, this may imply that the hydrocarbon-containing gas is mixed with a $CO_2$ comprising gas.

Under reforming conditions, and in the presence of a catalyst, at least part of the hydrocarbon of the hydrocarbon-containing gas is converted into $H_2$ and other components, especially CO and/or $CO_2$. The reforming reaction is an endothermic reaction. Hence, it is advantageous when a separator is used which selectively separates a component from the reaction product(s) of the reforming reaction, i.e. a separation enhanced steam reforming. As indicated above, the components formed may for instance be $H_2$, or CO or $CO_2$. Optionally, the separator may be selective for $H_2$ and CO, and not for $CO_2$, or for CO and $CO_2$, and not for $H_2$. In the former case, syngas is removed via the separator (especially a membrane), which may be used for the further production of desired hydrocarbons. In the latter case, a gas may be obtained that is relatively pure in $H_2$. As will be clear to the person skilled in the art, the separator may also be selective for $H_2$. Dependent upon the desired reaction product, the specific type of separator may be applied. The separator may be a sorbent, especially configured to absorb or adsorb one or more of the reaction products. In another embodiment, the separator may be a membrane, selective for one or more of the reaction products.

The hydrocarbon-containing gas and the steam (or $CO_2$-comprising gas) are introduced in a reaction chamber of a reactor. Such reaction chamber may be a single chamber or a plurality of chambers. If a plurality of chambers is applied, those may be arranged in a parallel or sequential mode.

In an embodiment, the reaction chamber also includes the separator. Such constructions are known in the art, and are for instance described in WO2004/021495 or WO2006/034086. An example of a suitable technology for $CO_2$ separation is for instance sorption and membrane enhanced water gas shift and sorption and membrane enhanced reforming.

The hydrocarbon-containing gas may be subjected to a reforming reaction at a temperature in the range of 400-750° C., especially 500-700° C. Due to the presence of the catalyst of the invention and also due to the presence of the separator, the temperature can be in these relative low temperature regions, while still providing a relatively efficient conversion of the hydrocarbon to $H_2$.

In the absence of the separator, the temperature may for instance be in the range of 400-1000° C., such as 700-1000° C., like 750-950° C. Hence, in an embodiment, the hydrocarbon-containing gas may be subjected to a reforming reaction at a temperature in the range of 700-1000° C., especially 750-950° C., especially in the absence of such separator, as it may be the case in industrial stream reforming processes.

Therefore, in general, the hydrocarbon-containing gas may be subjected to a reforming reaction at a temperature in the range of 400-1000° C., wherein with separator, the temperature may especially be in the range of 400-900° C., even more especially 400-800° C., yet even more especially 400-750° C., and wherein without separator, the temperature may especially be in the range of 700-1000° C.

Herein, the term "reforming" may in an embodiment also refer to pre-reforming.

Hence, in a further aspect, the invention also provides the use of a catalyst as described herein to let at least part of a hydrocarbon-containing gas react in a reforming reaction to a hydrogen containing gas, especially at a reaction temperature in the range of 400-1000° C. In this way, the hydrocarbon in the hydrocarbon containing gas may be converted into $H_2$ (and CO and/or $CO_2$). In an embodiment, this may be a reforming reaction, in another embodiment, this may be a pre-reforming reaction. In yet a further embodiment, this may be a sorption enhanced reforming, such as with a sorbent or a membrane (selective for a predetermined reaction product of the reforming reaction).

The catalyst of the invention preferably comprises a porous support material. As indicated herein, the catalyst may essentially consist of such catalyst. Herein, the term porous especially refers to pores of size 0.1-50 nm, especially 0.1-30 nm, such as 0.1-20 nm. The Barrett-Joyner-Halenda (BJH) method was used with $N_2$ adsorption-desorption data at 77K to obtain data on the pore-sizes. Especially, the porous catalyst comprises pores having an average pore size in the range of 1-30 nm, such as 1-20 nm, such as at least 2 nm, more preferably a pore size in the range of 4-30 nm, such as 5-15 nm, especially 4-13 nm, such as 4-8 nm or 8-13 nm. Further, preferably at least 20% of the Ni, more preferably at least 50% of the Ni (as reduced Ni) is present in such pores. Here, the percentage relates to the total amount of Ni comprised by the porous catalyst (i.e. wt. %). In a specific embodiment, the catalyst has high surface area (most often between 50 and 300 m²/g in particular between 100 and 300 m²/g), large pore widths (8-13 nm), relatively large pore volume (0.3-1.4 cm³/g).

In an embodiment, the porous catalyst comprises (porous) magnesium-aluminium mixed oxide material, such as $MgAl_2O_4$, $Al_2O_3$, MgO, MgO—$Al_2O_3$, Ni—MgO—$Al_2O_3$, etc. Especially, the porous catalyst comprises porous $MgAl_2O_4$ and MgO—$Al_2O_3$ mixed oxide but as indicated above, also other type of material may be applied. In the remainder of the text the mixed oxide is referred to as Mg(Al)O.

The porous catalyst may not only (further) comprise Ni and B, but may also comprise other materials, (i.e. other than magnesium, aluminium, nickel and boron). Instead of or in addition to magnesium, the porous catalyst may further comprise one or more of Ti (titanium), Ca (calcium), Cr (chromium), Fe (iron), Zr (zirconium) and Mn (manganese). In particular the catalyst comprises one or more of Ca and Ti (and Mg). These metals are preferably present as their oxides or oxide mixtures. Especially such materials may further increase stability of the catalyst and/or improve catalyst performance. Such elements may advantageously be present as framework material (see also below).

Preferably, the catalyst comprises at least 30 wt. %, up to 95 wt. % of the combination of magnesium oxide (calculated as MgO) and aluminium oxide (calculated as $Al_2O_3$). More preferably, the total level of magnesium and aluminium oxides is between 50 and 95 wt. %, most preferably 70-90 wt. %. The weight ratio of magnesium oxide (as MgO) to aluminium oxide (as $Al_2O_3$) is preferably from 2:98 to 60:40, more preferably from 9:91 to 40:60. The (atomic) Mg:Al ratio is preferably from 5:95 to 63:27, more preferably from 11:89 to 46:54. If metals selected from Ca, Ti, Zr, Cr, Mn and Fe are present, instead of or in addition to Mg, the atomic ratio of (Mg+Ca+Ti+Zr+Cr+Mn+Fe):Al is similarly preferably from 2:98 to 60:40, more preferably from 9:91 to 40:60, and the weight ratio based on the oxides is calculated accordingly. The proportion of aluminium oxide of the total catalyst weight is preferably 30-75 wt. %, more preferably 45-65 wt. %, and the proportion of magnesium oxide or other metal oxide, of the total catalyst weight is preferably 8-50 wt. %, more preferably 15-35 wt. %.

In an embodiment, the porous catalyst further comprises a noble metal (such as Rh, Pt, Ru, Pd, etc.), especially Rh. Additionally or alternatively, the porous catalyst further comprises one or more of La, Cu, Sn, Mo, Ce, Y, K, Re, V, (alkaline metals) Na, K, Cs and (alkaline earth metals) Be, Sr, and Ba (i.e. the catalyst comprises an additional metal-based compound), in particular all metal (oxides, salts etc) having a reduction temperature lower than 600° C. Hence, in an embodiment, the Ni—B porous catalyst may be activated (i.e. especially non-framework elements, see also below) with one or more of Rh, Pt, Ru, Pd, La, Cu, and Sn etc. These elements may be introduced to the porous catalyst in the same way as Ni (see below). The term (noble) metal does not imply that the element is present in its metal form. It may also be present as for instance an oxide. However, under reducing conditions, the metal compound may be reduced to a metal. An advantage of the presence of one or more of such metals, like Rh, Pt, Ru, Pd, La, Cu, Sn and Fe, may be a lowering in the energy necessary for reduction (of the predominant nickel components in the as-synthesized or oxidized catalyst) to Ni, while also having the advantages of the relative small Ni particle size due to the presence of B. In a specific embodiment, the catalyst is a porous catalyst based on at least magnesium oxide and aluminium oxide, wherein the porous catalyst further comprises boron and nickel, and additionally one or more of Rh, Pt, Ru, Pd, La, Cu, and Sn. The amount of this additional element is preferably 0.01-5 wt. %, on the basis of total (dry) catalyst weight, preferably 0.05-3 wt. %, most preferably 0.1-2 wt. %, while the amount of the one or more noble metals (Rh, Pt, Ru, Pd) is preferably 0.01-4 wt. %, more preferably 0.05-1 wt. %.

In another specific embodiment, the porous catalyst does not comprise further activators than Ni (and B).

The phrase "based on at least magnesium oxide and aluminium oxide" indicates that those materials are basis of the framework of the porous catalyst. Especially, the porous catalyst is a magnesium aluminium oxide material, as indicated above, i.e. a mixed oxide. Ti, Ca, Cr, Fe, Zr and Mn may also be used as framework material, but may also be non-framework material, and may be present in the pores. Especially, Ni is not a framework material, and is substantially present in the pores. B may be a framework material or may be in the pores (as non-framework material). The phrase "wherein the porous catalyst further comprises boron and nickel" indicates that those materials may be present as compound, such as boron oxide or boric acid, and for instance nickel oxide. Nickel and/or boron materials may be impregnated to the magnesium oxide and aluminium oxide based porous catalyst, for instance with a nickel salt and/or boric acid. They may be present (at least) in the pores of the porous catalyst.

Boron may in an embodiment also be provided to the catalyst by physical-mixing, e.g. by using boron powder or any of the other boron compounds mentioned herein.

The weight of nickel relative to the total weight of the porous catalyst is preferably selected from the range of 4-70 wt. %, preferably 10-45 wt. %, most preferably 15-25 wt. %. The total weight of the porous catalyst thus refers to the porous catalyst, including boron, nickel and optionally other activators (than Ni). Here, the weight of nickel relates to the element nickel, and not to nickel oxide (whereas, as indicated herein, in general under non-reaction conditions, nickel will be present as nickel oxide, and under reaction conditions as metallic nickel).

Further, the weight of boron (B) relative to the total weight of the porous catalyst is preferably selected from the range of 0.1-20 wt. %, preferably 0.5-5 wt. %. The total weight of the porous catalyst thus refers to the porous catalyst, including boron, nickel and optionally other activators (than Ni). Here, the weight of boron relates to the element boron, and not to boric acid.

It especially appears that such catalyst provides the desired catalytic properties. With larger pores, nickel still have ample space in pores and sinter too much and soot formation may be too large. With smaller pores, very small nickel particles with very high activity are formed in such pores but a large fraction of the nickel will locate at the external surface of the support, making them prone to sintering. With lower Ni content, the activity may be too low, and with higher Ni content soot formation may be again too high. Especially good results may be obtained with pores having sizes in the range of 4-30 nm, such as 4-15 nm, like 5-15 nm.

As indicated above, the nickel may be present as nickel oxide. However, under reaction conditions, preferably nickel is present as metallic nickel. Within the pores, metallic nickel particles may form, having dimensions that are imposed by the pore size. Hence, in a specific embodiment, prior to subjecting a hydrocarbon-containing gas in a reaction chamber to a reforming reaction, the catalyst is subjected to reducing conditions. And, also for this reason the pore size is preferably in the range of 4-30 nm, such as 4-15 nm, like 5-15 nm, such as 4-8 nm or 8-13 nm, because then relative good results may be obtained in view of stability, soot formation, and yield.

Likewise, the amount of nickel relative to the total weight of the porous catalyst is preferably selected from the range of 15-25 wt. %, relative to the total weight of the porous catalyst, preferably equal to or lower than 22.5 wt. %.

When the porous catalyst is subjected to reducing conditions, the Ni particles thus obtained have particle dimensions in the range of 0.1-50 nm, like 1-30 nm, such as 4-30 nm respectively. The pore sizes may dictate the particle size dimensions. Here, the term dimensions refers to length, width and height, but in the case of substantially spherical particles, it may also refer to diameter. The catalyst which has been subjected to reducing conditions can be sufficiently stable for storage and transport. The stability can be enhanced by a passivation step, so as to reduce a pyrophoric nature of the reactive metals such as nickel. This can, for example, be effected by providing a thin oxide or carbonate layer on the metal.

Hence, the invention also provides a porous catalyst based on at least magnesium oxide and aluminium oxide, wherein the porous catalyst further comprises boron and nickel, and wherein when the porous catalyst is subjected to reducing conditions, the Ni particles thus obtained have particle dimensions in the range of 0.1-50 nm, like 0.1-30 nm, such as 1-30 nm, like 4-30 nm, respectively, and wherein the porous catalyst preferably comprises pores having a pore size in the range of 0.1-50 nm, like 0.1-30 nm, such as 1-30 nm, like 4-30 nm, respectively.

The porous catalyst comprises pores having a pore size in the range of 0.1-50 nm, especially 0.1-30 nm, such as 0.1-20 nm, such as 1-30 nm, like 1-20 nm, like 4-15 nm, such as 5-15 nm, like 8-13 nm. Especially, the porous catalyst comprises a magnesium aluminium oxide material (denoted Mg(Al)O), such as porous $MgO$—$Al_2O_3$ mixed oxide and $MgAl_2O_4$. The porous catalyst may further comprise one or more of Ti, Ca, Cr, Fe, Zr, Mn, such as one or more of Ca and Ti as described above (and below).

In yet a further aspect, the invention also provides a process for the production of a porous catalyst, the method comprising: providing a magnesium compound or another compound from the group Mg, Ca, Ti, Zr, Cr, Mn, Fe, an aluminium compound, a nickel compound, a boron compound, and a pore former (structure-directing agent), forming in a formation process a porous material by combining at least the compound of Mg, Ca, Ti, Zr, Cr, Mn, Fe, the aluminium compound and the pore former and subjecting these compounds to crystallisation conditions to provide a porous material, and calcining the thus formed porous material, wherein (1) the boron compound is present during the formation process and/or wherein the boron compound is applied to the porous material obtained by the formation process, and wherein (2) the nickel compound is present during the formation process and/or wherein the nickel compound is applied to the porous material obtained by the formation process. In this way, the porous catalyst is formed.

Likewise, other elements may be introduced. For instance, the Ni—B systems described herein can be combined with the promoters known from industrial steam reforming catalysts.

Ni may be assisted with one or more promoters or the promoters may have otherwise a beneficial effect, such as stabilizing the catalyst and/or stabilizing the particle size. Examples thereof may be one or more selected from (1) one or more of alkaline elements, (2) one or more of noble metal elements, (3) one or more of group 3-11 of the periodic table of the elements, (4) one or more lanthanide elements, and (5) one or more of actinide elements. For instance, as further element (for instance as promoter), in addition to B and Ni, one or more elements may be selected from the group consisting of Li, Na, K, Rb, Cs, Be, Mg, Ca, Sr, Ba, Sc, Y, La, Ce, Pr, Nd, Sm, Eu, Gd, Tb, Dy, Ho, Er, Tm, Yb, Ti, Zr, Hf, V, Nb, Ta, Cr, Mo, W, Mn, Re, Fe, Ru, Os, Co, Rh, Pd, Pt, Cu, Ge and Sn. Again, the term "element" does not necessarily indicate that those elements are present in their elementary form, but those elements may also be present in the form of an oxide or salt (and may for instance have been introduced via impregnation into the pores).

An alkaline element (as non-framework element), like Na, K, Rb, and Cs, for instance present in the form of an oxide or a salt (or a combination thereof), may for example increase steam adsorption, aids gasification carbon precursors, prevent deposition carbon).

An alkaline earth element (as non-framework element), like Be, Mg, Ca, Sr, and Ba, but also an element such as Ge or Sn, for instance present in the form of an oxide or a salt (or a combination thereof), may for example decrease atom mobility and thereby reduce sintering.

A scandium group element or a lanthanide (as non-framework element), like Sc, La, Ce, Pr, Nd, Pm, Sm, Eu, Gd, Tb, Dy, Ho, Er, Tm, Yb, and Lu, for instance present in the form of an oxide or a salt (or a combination thereof) may for example increase steam adsorption, aids gasification carbon precursors, or prevent deposition carbon.

Especially those elements are used, which when available in the form of a salt, have a reduction temperature lower than 600° C., for instance to aid the reduction of nickel component to metallic Ni.

For instance, one or more of Rh, Pt, Ru, Pd, La, Cu, Sn and Fe, etc. may be present as Rh, Pt, Ru, Pd, La, Cu, Sn and Fe compound (etc.) during the formation process and/may be applied to the porous material obtained by the formation process. In general, Ni compounds, as well as the optional Rh, Pt, Ru, Pd, La, Cu, Sn and Fe compound (etc.) may be applied (together or sequentially) to the porous material obtained by the formation process, for instance by impregnation. Those elements may for instance be introduced in the form of oxides, etc. Under reducing conditions, metal particles may be formed.

The total amount of noble metals may for instance be present in an amount of 0.01-4 wt. %, especially 0.05-1 wt. % relative to the total weight of the porous catalyst. Non-noble metals may for instance be present in an amount of 0.01-20 wt. %, more preferably 0.1-10 wt. %.

Hence, for instance the porous catalyst based on at least an oxide of Mg, Ca, Ti, Zr, Cr, Mn and/or Fe, and aluminium oxide comprises B and Ni (wherein Ni may be present as metal after reduction), and for instance one or more of the other promoters described above, such as Rh or Pt or Cu, or Sn, or Fe, or a combination of one or more of such elements. Such other elements may promote the Ni based catalytic reaction.

The formation process may especially be a wet-chemical technique in particular a sol-gel process. The hydrolysis of aluminium alkoxide with preferably an alcohol like ethanol takes place in the presence of an organic structure-directing agent which is capable of forming meso-sized micelles that are bounded by the hydrolyzing aluminium alkoxide source. Appropriate time of the sol-gel synthesis process is from 1.5 to 12 days and temperature of the synthesis from room temperature or higher, depending on type copolymer.

In an embodiment of the formation process, the aluminium compound comprises an organo-aluminium compound, such as aluminium isopropoxide, sec-butoxide, acetylacetonate and the like. The magnesium compound may a soluble magnesium salt, such as magnesium nitrate ($Mg(NO_3)_2.6H_2O$) or the acetate etc. analogues. The other metals can be used in the formation process as their soluble or dispersible salts, such as nitrates, acetates etc., e.g. titanium alkoxides, nitrate or chloride, calcium chloride or nitrate, zirconium alkoxide or nitrate, or halides, nitrates or the like of chromium, manganese or iron. Examples of suitable nickel compounds are soluble nickel salts, for instance nickel nitrate, nickel acetate, etc. In an embodiment, the nickel compound comprises a nickel nitrate, such as $Ni(NO_3)_2.6H_2O$.

The boron compound preferably comprise one or more compounds selected from the group consisting of (1) boric acid, (2) borate salts such as borax (sodium tetra-borate decahydrate) or other hydrates, and water-soluble boron containing compound such as the minerals borax ($Na_2B_4O_5(OH)_4.8(H_2O)$), colemanite ($CaB_3O_4(OH)_3.(H_2O)$), ulexite ($NaCaB_5O_6(OH)_6.5(H_2O)$) and kernite ($Na_2B_4O_6(OH)_3.3(H_2O)$), (3) a boron halide, such as boron trifluoride ($BF_3$), boron trichloride ($BCl_3$), and an alkali metal borohalide, such as sodium borofluoride ($NaBF_4$), (4) boron tribromide dimethyl sulphide complex solution in methylene chloride ($(CH_3)_2S.BBr_3$), (5) an alkali metal borohydride, such as e.g. a $KBH_4$ solution, (5) a boric oxide, (6) an alkyl borate, (7) sodium cyano boro hydride $NaBH_3(CN)$, and (8) boron powder.

As indicated above, nickel is preferably present in the pores. This may for instance be achieved by applying a (aqueous) solution, or optionally an aqueous slurry, of a nickel salt to the porous material. This may also be achieved by producing the porous material in the presence of the nickel compound. After production of the catalyst, including calcination and reduction, the nickel may especially be present as metallic nickel. Hence, the nickel compound may be present during the formation process (of the porous material) and/or the nickel compound may be applied to the porous material obtained by the formation process. Nickel may alternatively or additionally also be present at the surface of the porous material.

As indicated above, boron may be present in the pores. This may for instance be achieved by applying the boron compound, an (aqueous) liquid composition with the boron compound, or optionally an aqueous slurry, with the boron compound to the porous material. This may also be achieved by producing the porous material in the presence of the boron compound. After production of the catalyst, including calcination and reduction, boron may especially be present as nickel boride although low amounts of elementary boron and boron oxide may be present too. Hence, boron may be present in the pores, but may alternatively or additionally also be present at the surface of the porous material. Boron may in an embodiment also be provided to the catalyst by physically mixing the boron compound, e.g. by using boron powder or any of the other boron compounds mentioned herein, with the porous material.

In yet a further embodiment, the boron compound comprises boric acid. In yet a further embodiment, wherein the pore former comprises a triblock copolymer having a molecular weight in the range of 3000-18,000 Da, such as Pluronic® 123 ($HO(CH_2CH_2O)_{20}(CH_2CH(CH_3)O)_{70}(CH_2CH_2O)_{20}H$, which corresponds to a molecular weight of around 5800 Da) or Pluronic® F127 (molecular weight of around 12,600 Da). Other options are Pluronic® F87, F68 and F108. Synthesis may also concern a mixture of various copolymers. Calcination, preferably above 500° C., is especially advantageous to remove organic residual material from the pores. In yet a further embodiment, the mesopores are formed in the presence of sugars, saccharides, e.g. glucose, sucrose, starch, maltodextrins and cyclodextrins or other oligosaccharides (MW 300-3000) or polysaccharides (MW above 3000) as pore-formers.

Other elements, like one or more of Rh, Pt, Ru, Pd, La, Cu, Sn and Fe, as well as the other above mentioned elements, may be introduced in the same way as Ni. Non-framework material may be present in the pores, and may have for instance been introduced via impregnation.

If for reasons of a particular application the pore size of the (Mg,Al based) support material is not very critical, the advantages of the synergy between Ni, B and Mg may also be obtained with other synthesis methods in which the Ni,B supported catalysts is made by loading the support $MgAl_2O_4$ with Ni and B, and having the $MgAl_2O_4$-based support synthesized by methods other than sol-gel, and known to the skilled person in the field e.g. calcination of a mechanical mixture of Mg and Al oxide and/or salts, precipitation method, the aerosol method, the citrate-nitrate route, pyrolysis of aluminium and magnesium complex compounds with triethanolamine, PVA evaporation technique, combustion synthesis, using urea and sucrose as fuel etc.

The term "substantially" herein will be understood by a person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

FIGURES

FIG. 1a/1b show TEM figures of 40.1 wt % Ni with average particle size of 20 nm (bars 50 nm);

EXAMPLES

Example 1

Nickel Particle Size

Figure 1A:
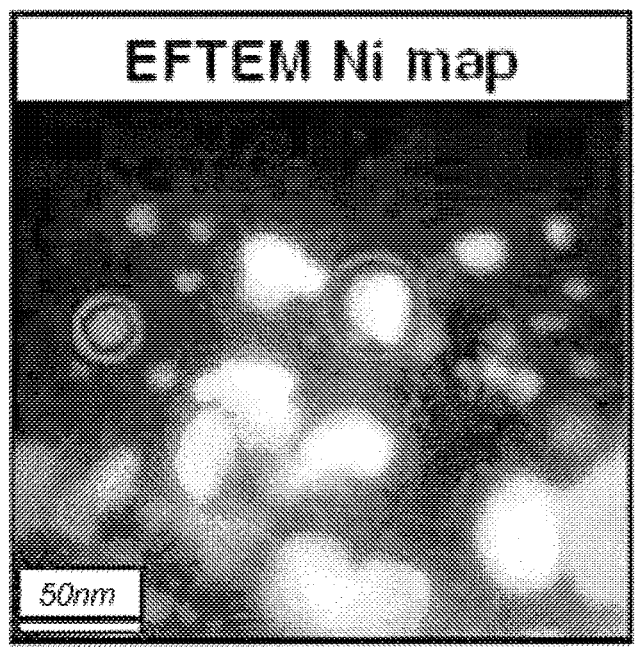
Figure 1B:
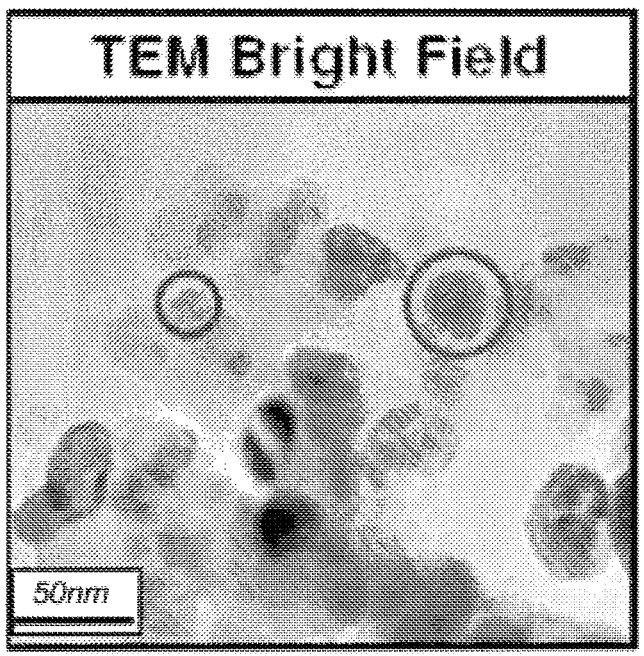

Nickel was impregnated on an $MgAl_2O_4$ support (30 nm particles, 60 $m^2/g$) using a stock solution prepared by dissolving $Ni(NO_3)_2.6H_2O$ in 100 ml demi water (100 gr/100 ml). For impregnation, the solution was added to the support drop wisely as to achieve 19.8% and 40 wt % Ni for two independent impregnations. After impregnation the sample was calcined again, with 0.5° C./min-600° C.-4 hr.

Alternatively, smaller nickel particles were prepared with homogeneous deposition precipitation (HDP). For HDP first 1 or 2 g of $MgAl_2O_4$ was mixed in a large amount of water (150 mL). Nickel salt was then added in an amount equal to obtain 5, 15 and 20 wt % of Nickel (pH 7-9). The pH was brought to 2 with a $HNO_3$ 1M solution. The suspension was stirred and heated at 90° C. An aqueous solution of urea (20 mL) was added to start precipitation. The pH was monitored during precipitation and typically after 16 to 24 hour the precipitation was finished, the mixture subsequently cooled and filtrated. The oven-dried sample was then calcined, with 0.5° C./min-600° C.-4 hr.

Stability Testing:

Stability testing of catalysts under 2 conditions at 600° C., 1 atm.: Condition with H/C=10 (RC1: 7.5% $CH_4$, 22.5% $H_2O$) was periodically changed to H/C=2.9 (RC3: 1.3% $CH_4$, 0.14% CO, 11.6% $CO_2$, 16% $H_2O$); the latter condition represents a (low H/C) membrane condition. Catalysts were diluted with inert alumina in order to measure true catalyst activity, i.e. far from equilibrium conversion.

Ni particle size in relation to methane conversion activity and deactivation expressed by −Kd ($h^{-4}$), the latter represents the slope of the decay towards lower conversion. X initial is the methane conversion activity in percent converted methane after 10 minutes on stream. See Table 1 below.

TABLE 1

Composition, activity and stability of SR catalysts of Example 1

| | Ni (wt %) | particle size (nm) | −Kd($h^{-1}$) RC1 | −Kd ($h^{-1}$) RC3 | X initial (%) |
|---|---|---|---|---|---|
| Ni HDP8 | 5.2 | 6.1 | 1.113 | — | 30 |
| Ni HDP5 | 14.1 | 7.3 | 0.271 | 0.234 | 73 |
| Ni HDP | 20.1 | 10.5 | 0.094 | 0.091 | 81 |
| Ni impr | 19.8 | 13.4 | 0.089 | 0.160 | 75 |
| Ni impr | 40.4 | 19.7 | 0.147 | 0.267 | 73 |

Two deactivation paths are active: carbon deactivation, more carbon with bigger particle size and sintering gains importance at smaller particle sizes as indicated from TPR and EXAFS analysis. So an optimum particle size to prevent extensive deactivation exists: larger particles produce carbon, smaller particles sintering/re-structure. Oxidation of the reduced Ni metallic active site by reaction was concluded to not contribute by XAS and TPR/TPO studies. From this study the 10-13 nm particles (on average) obtained with impregnation of nickel nitrate with an amount equalling 19-20 wt % Ni appears to be especially a good choice for high conversion activity and improved stability. The stability can however still be improved, by anchoring the Ni particles in a porous Mg(Al)O structure to reduce their susceptibility toward migration and sintering. In order to further suppress the carbon formation activity of the Ni—Mg(Al)O catalyst, the effect of promoters was studied, see Example 2.

Example 2

Synthesis of $MgAl_2O_4$ Support with Nickel and Second Metals (Sn, Pt, Cu, Pd, La, Ce, Pr, Gd, Boron Impregnated)

Nickel was impregnated on an $MgAl_2O_4$ support using a stock solution prepared by dissolving $Ni(NO_3)_2.6H_2O$ in 100 ml demi water (100 gr/100 ml). For impregnation, the solution was added to the support drop-wise so as to achieve 20 or 40 wt % Ni. After impregnation the sample was again calcined, with 0.5° C./min-600° C.-4 hr.

The second metallic component was impregnated onto the Nickel containing $MgAl_2O_4$ using a metal salt solution. After impregnation the sample was calcined again, with 0.5° C./min-600° C.-4 hr.

Stability Testing:

Stability testing of catalysts under 2 conditions at 600° C., 1 atm.: Condition with H/C=10 is denoted "Reference conditions RC" using 7.5% $CH_4$, 22.5% $H_2O$, balance $N_2$, and was periodically changed to H/C=2.9 (1.3% $CH_4$, 0.14% CO, 11.6% $CO_2$, 16% $H_2O$, balance $N_2$); the latter condition represents a (low H/C) simulated membrane condition. RC1 and RC3 denote the first and third period respectively the catalyst is exposed to the reference condition (RC3: at the time of RC3 the catalyst was exposed to two previous periods of reference condition and 2 periods of simulated membrane conditions).

Catalysts were diluted with inert alumina (1:27) in order to measure true catalyst activity, i.e. far from equilibrium conversion. Space velocity (SV)=1,290,000 $h^{-1}$. See Table 2:

TABLE 2

Composition, activity and stability of SR catalysts of Example 2

| M | Ni (wt %) edx | M (wt %) | X ini (873K) | −Kd ($h^{-1}$) RC1 | −Kd ($h^{-1}$) RC3 |
|---|---|---|---|---|---|
| — | 19.8 | 0 | 75 | 0.089 | 0.160 |
| Sn | 19.8 | 0.5 | 12 | 0.072 | 0.073 |
| Pt | 19.5 | 0.5 | 31 | 0.12 | 0.09 |
| Pd | 19.5 | 0.5 | 40 | 0.14 | 0.096 |
| La | 19.5 | 2 | 70 | 0.319 | 0.387 |
| La | 19.5 | 7.9 | 40 | 0.271 | 0.00 |
| Ce | 19.5 | 2.1 | 73 | 0.13 | 0.172 |
| Ce | 19.3 | 8.1 | 71 | 0.122 | 0.218 |
| Pr | 19.9 | 2 | 71 | 0.123 | 0.167 |
| Gd | 19.9 | 2 | 71 | 0.257 | 0.564 |
| Gd | 40.1 | 2 | 71 | 0.290 | 0.440 |
| Cu | 20.1 | 2.4 | 45 | 0.025 | 0.10 |
| B | 41.1 | 2.8 | 78 | 0.001 | 0.002 |
| B | 19.3 | 1.4 | 86 | 0.037 | 0.027 |
| B | 19.3 | 2.8 | 90 | 0.045 | 0.001 |

Only Lanthanum and Boron stabilize the Ni catalyst against deactivation after repeated exposure to simulated membrane conditions and extended operation times. When using Boron, with the $MgAl_2O_4$ support the higher amount of nickel for the catalyst is beneficial. The 40 wt % Ni system suffers from deactivation by carbon only and the effect of boron here is mainly to block carbon deposition onto the catalyst and therefore the carbon route toward deactivation (note that the sintering contribution of the 40 wt % Ni system is insignificant due to the larger particle size).

However the deactivation of the lower loaded Ni catalyst is predominated by Ni particle sintering and the effect of Boron is only obvious at extended times on stream when the Ni particle size is increased during RC1 (high −Kd) and the predominating deactivation transits from sintering toward carbon, which in turn is effectively blocked by B, see the low −Kd during RC3. As was known from literature Lanthanum shows very good carbon gasification behaviour and therefore high stability but the problem is the conversion: the initial conversion drops substantially after loading the Ni catalyst with La.

Example 3

Synthesis of Nickel Containing Porous Mg(Al)O Catalyst

Solution 1) prepared at room temperature: Pluronic 123 was dissolved in 10 to 20 ml ethanol, under vigorous stirring.

Solution 2) prepared at room temperature: The components magnesium nitrate (1 gram), aluminium isopropoxide (3.2 grams) and nickel nitrate (2 gram) were combined in a beaker in the fume hood and first ethanol (10 ml) was added, subsequently (2.6 ml) nitric acid (65%). The salts were dissolved by vigorous stirring.

Solution 2 was added to solution 1, sealed with PE-film and stirred during 5 hours at room temperature. After 5 hours, the solution was placed in an oil bath and heated to 60° C. Crystallization was initiated under evaporation during 48 hours under a small air flow. After 48 hours the sample was calcined in the tube oven, with 1° C./min to 650° C.-700° C. with an air flow of 50 ml/min and kept there for 4 hr. The results are given in Table 3.

Example 4

Synthesis of Nickel-Containing Porous Mg(Al)O Catalyst Subsequently Impregnated with Boron The Nickel containing porous MgO—$Al_2O_3$ mixed oxide catalyst prepared in Example 3 was impregnated with Boron. Boron was impregnated onto the Nickel containing porous magnesium aluminate using 2 to 3 ml of Boric acid (approx. 0.6 M). After impregnation the sample was again calcined, with 0.5° C./min-600° C.-4 hr. The results are given in Table 3.

Example 5

Synthesis of Porous Mg(Al)O Support with Nickel Impregnated

Solution 1) prepared at room temperature: Pluronic 123 was dissolved in 10 to 20 ml Ethanol, under vigorous stirring.

Solution 2) prepared at room temperature: The components magnesium nitrate (1 gram) and aluminium isopropoxide (3.2 grams) were combined in a beaker in the fume hood and first ethanol (10 ml) was added, subsequently (2.6 ml) nitric acid (65%). The salts were dissolved by vigorous stirring.

Solution 2 was added to solution 1, sealed with PE-film and stirred during 5 hours at room temperature. After 5 hours, the solution was placed in an oil bath and heated up to 60° C. Crystallization was initiated under evaporation during 48 hours under a small air flow. After 48 hours the sample was calcined in the tube oven, with 1° C./min to 650° C.-700° C. with an air flow of 50 ml/min and kept there for 4 hr.

Typical hysteresis loops in nitrogen adsorption isotherms gives information on porosity of the materials. The formation of ordered hexagonal p6 mm symmetry porous structures can also be obtained from X-ray diffraction patterns.

The nickel was impregnated on calcined support using a stock solution prepared by dissolving $Ni(NO_3)_2.6H_2O$ in 100 ml demi water (100 gr/100 ml). For impregnation, the solution was added to the support drop-wise so as to achieve 19 wt % Ni. After impregnation the sample was again calcined, with 0.5° C./min-600° C.-4 hr. The results are given in Table 3.

Example 6

Synthesis of Porous MgO—$Al_2O_3$ Support with Nickel Impregnated and Sequentially Impregnated with Boron The Nickel impregnated porous MgO—$Al_2O_3$ catalyst prepared in Example 5 was impregnated with Boron. The Boron was impregnated onto the Nickel containing porous magnesium aluminate using 2 to 3 ml of Boric acid (approx. 0.6 M). After impregnation the sample was again calcined, with 0.5° C./min-600° C.-4 hr. The results are given in Table 3.

Example 7

Synthesis of Nickel and Boron Containing Porous MgO—$Al_2O_3$ Catalyst

Solution 1) prepared at room temperature: Pluronic 123 was dissolved in 10 to 20 ml Ethanol, under vigorous stirring.

Solution 2) prepared at room temperature: The components magnesium nitrate (1 gram), aluminium isopropoxide (3.2 grams), nickel nitrate (2 gram) and 2 to 3 ml of Boric acid (approx. 0.6 M) were combined in a beaker in the fume hood and first ethanol (10 ml) was added, subsequently (2.6 ml) nitric acid (65%). The salts were dissolved by vigorous stirring.

Solution 2 was added to solution 1, sealed with PE film and stirred during 5 hours at room temperature. After 5 hours, the solution was placed in an oil bad and heated up to 60° C. Crystallization was initiated under evaporation during 48 hours under a small air flow. After 48 hours the sample was calcined in the tube oven, with 1° C./min to 650° C.-700° C. with an air flow of 50 ml/min and kept there for 4 hr. The results are given in Table 3.

Example 8

Synthesis of $Al_2O_3$ Supported Nickel Catalyst

Alumina, Al-4172P (gamma alumina ~328 m2/g, BASF/Engelhard) was used as the support material. Nickel was impregnated on calcined support using a stock solution prepared by dissolving $Ni(NO_3)_2.6H_2O$ in 100 ml demi water (100 gr/100 ml). For impregnation, the solution was added to the support drop-wise up to a load of 19 wt % Ni. After impregnation the sample was again calcined, at 0.5° C./min-600° C.-4 hr (Example 8a).

Part of the nickel-impregnated $Al_2O_3$ catalyst was impregnated with boron (Example 8b). The boron was impregnated onto the nickel-containing $Al_2O_3$ using 2.19 ml $H_3BO_3$ solution (1.885 g $H_3BO_3$ in 50 ml) for 0.496 g nickel-impregnated $Al_2O_3$. After impregnation the sample was again calcined, with 0.5° C./min-600° C.-4 hr. The results are given in Table 3.

Example 9

Synthesis of MgO Supported Nickel Catalyst

Magnesium oxide (MgO, 99%, Sigma Aldrich, SA 100 $m^2/g$) was used as the support material. The nickel was impregnated on the calcined support using a stock solution prepared by dissolving $Ni(NO_3)_2.6H_2O$ in 100 ml demi water (100 gr/100 ml). For impregnation, the solution was added to the support drop wisely as to achieve 19 wt % Ni. After impregnation the sample was again calcined, with 0.5° C./min-600° C.-4 hr. The results are given in Table 3.

Example 10

Stability Tests with Porous Mg(Al)O Catalysts

Stability testing of catalysts under 2 conditions at 600° C., 1 atm.: Condition with H/C=10 is denoted "Reference conditions RC" using 7.5% $CH_4$, 22.5% $H_2O$, balance $N_2$, and was periodically changed to H/C=2.9 (1.3% $CH_4$, 0.14% CO, 11.6% $CO_2$, 16% $H_2O$, balance $N_2$); the latter condition represents a (low H/C) simulated membrane condition. RC1 and RC3 denote respectively the first and third period the catalyst is exposed to the reference condition (RC3: at the time of RC3 the catalyst has been exposed to two previous periods of reference condition and 2 periods of simulated membrane conditions). Catalysts were diluted with inert alumina (1:27) in order to measure true catalyst activity, i.e. far from equilibrium conversion. SV=1,190,000 $h^{-1}$, $T_{reduction}$ 650° C. The results are given in Table 3.

TABLE 3

Composition, activity and stability of SR catalysts of Examples 3-9

| Example | Catalyst | Ni (wt %) | B (wt %) | X initial (873 K) | −Kd * 10(h⁻¹) RC1 | −Kd * 10(h⁻¹) RC3 |
|---|---|---|---|---|---|---|
| 3 | Ni/Mg/Al one pot porous | 19.8 | 0 | 86 | 0.074 | 0.025 |
| 4 | Ni/Mg/Al one pot porous B-impr | 19.8 | 2.8 | 90 | 0.071 | 0.001 |
| 5 | Mg/Al prous Ni-impr | 19.8 | 0 | 78 | 0.175 | 0.022 |
| 6 | Mg/Al porous Ni-impr B-impr | 19.2 | 2.8 | 91 | 0.01 | 0.001 |
| 7 | Ni/B/Mg/Al one pot porous | 19.5 | 2.8 | 90 | 0.121 | 0.002 |
| 8a | Ni—Al$_2$O$_3$ | 19 | 0 | 30 | 0.163 | 2.598 |
| 8b | Ni—B—Al$_2$O$_3$ | 19 | 2.8 | 25 | 0.156 | 0.304 |
| 9 | Ni—MgO | 41 | 0 | 2 | n.d. | n.d |

All porous Mg(Al)O supported Ni and Ni—B catalysts show very high conversion activity and very good stability. The presence of boron also clearly improves the stability compared to the Ni only systems. Compared to the MgAl$_2$O$_4$Ni—B (Example 2) the Mg(Al)O support of porous character excels in the stabilization of small Ni particles obtained at low Ni loadings (19 wt %).

The combination of the Ni metallic active site and the magnesium-aluminium support lattice gives rise to some conversion activity enhancing synergy. For Ni—B Mg(Al)O the Boron, provided the amount of Boron exceeds 2.5 wt %, eases the reduction of NiO to metallic Ni (the active sites for the rate determining methane activation step) contrary to the Ni—B—Al$_2$O$_3$, described in the state-of-the art literature on Ni—B catalyst, for which Ni aluminate is formed and B has no effect on the reduction degree of Ni. The enhanced reduction of the nickel accomplishes a higher amount of metallic nickel sites after reduction at 650° C. and somewhat increased conversion activity for the Ni—B combination catalysts.

Also, boron might adsorb on the γ-Al$_2$O$_3$ support to form aluminium borate (9Al$_2$O$_3$-2B$_2$O$_3$). The MgO supported reference catalyst did not show any conversion activity under the conditions. Note that both the reference MgO and reference Al$_2$O$_3$ had an higher surface area and available nickel surface area compared to the MgAl$_2$O$_4$. The nickel supported by MgAl$_2$O$_4$ is therefore surprisingly much more active than the analogue alumina and MgO supported catalysts under the specific conditions.

Example 11

Nickel Particle Agglomeration at Elevated Temperatures

T(ramp up) and T(ramp down): 300-750-300° C.
T(calcination) 650° C.; T(reduction) 650° C.: SV=955,000 h⁻¹
7.5% CH$_4$, 22.5% H$_2$O, balance N$_2$.

TABLE 4

| | Methane conversion activity | | | |
|---|---|---|---|---|
| | Ni-porous MgO—Al$_2$O$_3$ (19 wt. % Ni) | | Ni—MgAl$_2$O$_4$ (19 wt. % Ni) | |
| T (° C.) | Conversion Tup | Conversion Tdown | Conversion Tup | Conversion Tdown |
| 458 | 31 | 30 | 25 | 7 |
| 509 | 58 | 57 | 54 | 38 |
| 557 | 78 | 78 | 78 | 71 |

TABLE 4-continued

| | Methane conversion activity | | | |
|---|---|---|---|---|
| | Ni-porous MgO—Al$_2$O$_3$ (19 wt. % Ni) | | Ni—MgAl$_2$O$_4$ (19 wt. % Ni) | |
| T (° C.) | Conversion Tup | Conversion Tdown | Conversion Tup | Conversion Tdown |
| 611 | 93 | 93 | 93 | 93 |
| 708 | 93 | 93 | 93 | 93 |

A temperature hysteresis is found in case of the MgAl$_2$O$_4$ material: the high reaction temperature of 700-750° C. causes nickel particles located on the external surface to grow in size which is reflected in a loss of methane conversion activity when going to lower temperature operation again. In case of the pore supported nickel particles the nickel particles are stabilized against sintering/particle growth inside the pores and no such loss in conversion activity is noticed after high temperature operation. The stabilization of the Ni particles is also beneficial for the regulation of carbon: larger Nickel particles are also more actively forming carbon and would require more Boron to prevent carbon-induced deactivation. The high temperature tolerance of the pore Mg(Al)O based Ni catalysts also shows promise for use under (high temperature) conditions of industrial reforming and reforming catalysis in fuel processors.

Further Examples

Catalysts were prepared with nickel, various promoters e.g. B, La, Cu, Sn, Rh, Pt, Pd etc. and supported by MgO—Al$_2$O$_3$ mixed oxide. The catalysts were investigated by Transmission Electron Microscopy (TEM), Temperature Programmed Reduction (TPR) and catalytic activity and stability.

The average Nickel particle size of the various catalysts prepared here was between 4 and 30 nm. B proves very useful to obtain very small Ni particles, in the range 4-8 nm, depending on Ni and B loading. Small nickel particles may be less prone to carbon formation than large nickel particles. The stability of the Ni—B catalyst in steam reforming is superior to Ni catalyst. B shows the tendency to bind to Ni as C and is therefore argued to selectively block step and subsurface sites and prevent formation of carbon nucleation sites by strong hindrance of C atom diffusion.

However, smaller particles are more difficult to reduce than larger ones. Using a typical reduction temperature of 600° C. to activate nickel catalyst in membrane reactors, only about 10 to 20%, depending on reduction environment and dwell time of reduction, of the nickel is reduced in Ni—B combination catalyst. Nevertheless the methane conversion activity, represented by the formula:

$$X_{CH_4} = 1 - \frac{[CH_4]_{out}}{[CH_4]_{in}}$$

at 600° C. compares very well with Ni catalyst having its fraction reduced nickel on a 4-5 times higher level. Catalysts modified by B show a much smaller Ni particle size, a much higher Ni dispersion and activity of the Ni surface atoms.

The degree of reduction of the nickel particles at 600° C. strongly increase with combining Nickel with the promoters La, Rh, Pd, Pt, precious metals in general but also with base metals, as an example Cu and Sn. Combination of the Nickel with the promoters La, Rh, Pd, Pt, precious metals in general but also with base metals, e.g. Cu and Sn, together with B offers additional advantages, in particular for separation enhanced reforming at low temperatures. The advantages may be:

1) The degree of reduction of the nickel particles in Ni—B catalyst at 600° C. strongly increases upon the presence of the third component (La, Rh, Pd, Pt, precious metals in general but also with base metals, e.g. Cu and Sn). As a result, the amount of metallic nickel present for the reforming reaction between 400 and 900° C. after reduction at 600° C. is significantly higher. As a consequence, (higher) conversion activity is achieved at lower temperatures.
2) The catalyst is also active for reforming reaction after reduction at temperatures lower than 600° C. Depending on the choice of the $3^{rd}$ component promoter and the exact composition of the catalyst in general, methane conversion is already significant after reduction (activation) at temperatures as low as 500° C. or even lower. Note that even the smallest conversion activity can increase dramatically when the catalyst is combined with a hydrogen selective membrane to pull the reaction toward completion. Lower reduction temperature may be desirable in case the membrane characteristics of the membrane (support) to be combined with the catalyst in a membrane reactor do not allow for high temperatures.

Example 12

Ni with Promoter Catalysts: Ni Particle Size

Standard copper grids were dipped into a dispersion of the supported nanoparticles in ethanol and then dried in air. A FEI Tecnai 20 TEM equipped with a LaB6 filament and a Gatan GIF200 energy filter was operated at 200 kV. The results of the TEM analysis is illustrated for the 40.1 wt. % Ni sample in FIG. 1a/1b. Identification of Ni particles occurs with EFTEM (energy filtered TEM) image (By using EFTEM images of specific energy-loss values it becomes possible to create images/maps which highlight the presence of a specific element, i.e. images which are bright where the element is found and dark where it is absent). Determination of particle diameters is possible in TEM bright field (together with statistical evaluation of the particle diameter distribution). The particle size distributions followed by analysis of at least 100 metal particles from at least four different micrographs.

Figure 2:
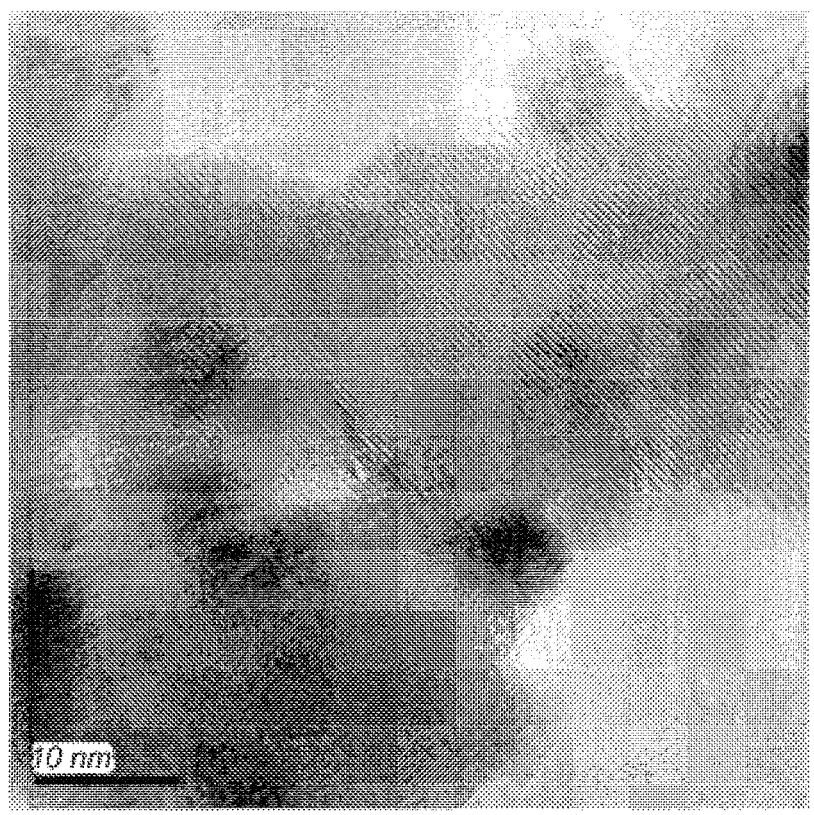
FIG. 2 shows a TEM figure of 40.1 wt % Ni-2.8 wt. % B with average particle size 7 nm (bar 10 nm)
Figure 3:
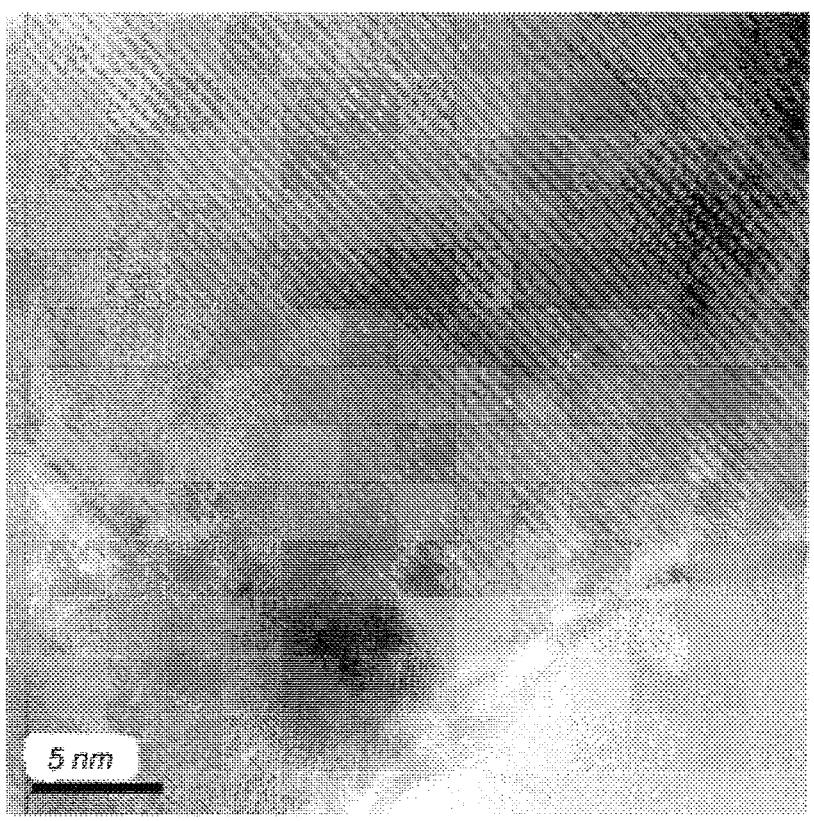
FIG. 3 shows a TEM figure of 18 wt % Ni-1.2 wt. % B with average particle size 5 nm (bar 5 nm)

The Ni particles become larger and the particle size distribution broadens with increasing Ni loading. In contrast to expectations, promotion with B has a pronounced effect on the nickel particle size. FIGS. 2-3 show TEM figures of two other samples (40.1 wt. % Ni/2.8 wt. % B with average particle size 7 nm; and 18 wt. % Ni/1.2 wt. % B average particle size 5 nm, respectively). The use of a small amount of Rh also led to a small decrease of the Ni particle size. However, this change is very small as compared to B promotion. See table 5 below.

TABLE 5

Ni and Ni-promoter catalysts (M = B, Rh, La) and average nickel particle size

| M | Ni (wt %) EDX | M (wt %) | Ni (nm) |
|---|---|---|---|
| comp. | 18 | 0 | 10 |
| B | 18 | 1.2 | 5 |
| Rh (comp.) | 18 | 0.35 | 8.5 |
| La (comp.) | 19.5 | 7.9 | 8 |
| Comp. | 40.1 | 0 | 20 |
| B (comp.) | 40.1 | 2.8 | 7 |

Example 13

Ni and (Other) Promoter Catalysts: Effect of Promoter Components on the Ease of Reductive Activation of Ni Catalyst and Activity of the Catalyst Temperature-programmed reduction (TPR) experiments were carried out in a flow apparatus equipped with a fixed-bed reactor, a computer-controlled oven and a thermal conductivity detector. Typically, an amount of catalyst was contained between two quartz wool plugs in a quartz reactor. The sample was reduced in 10 vol. % $H_2$ in argon at a flow rate of 30 ml/min, whilst heating from RT up to 1000° C. at a rate of 10° C./min. The $H_2$ signal was calibrated using a $CuO/SiO_2$ reference catalyst.

Conversion activity was measured between 300 and 900° C. at atmospheric condition with a feed gas 7.5% $CH_4$, 22.5% $H_2O$ (H/C=10). Catalysts were diluted with inert alumina on a powder scale in order to measure true catalyst activity, i.e. far from equilibrium conversion. The diluted catalyst was measured as a sieve fraction of 0.212-0.425 mm in a quartz reactor with internal diameter of 6 mm.

Figure 4:
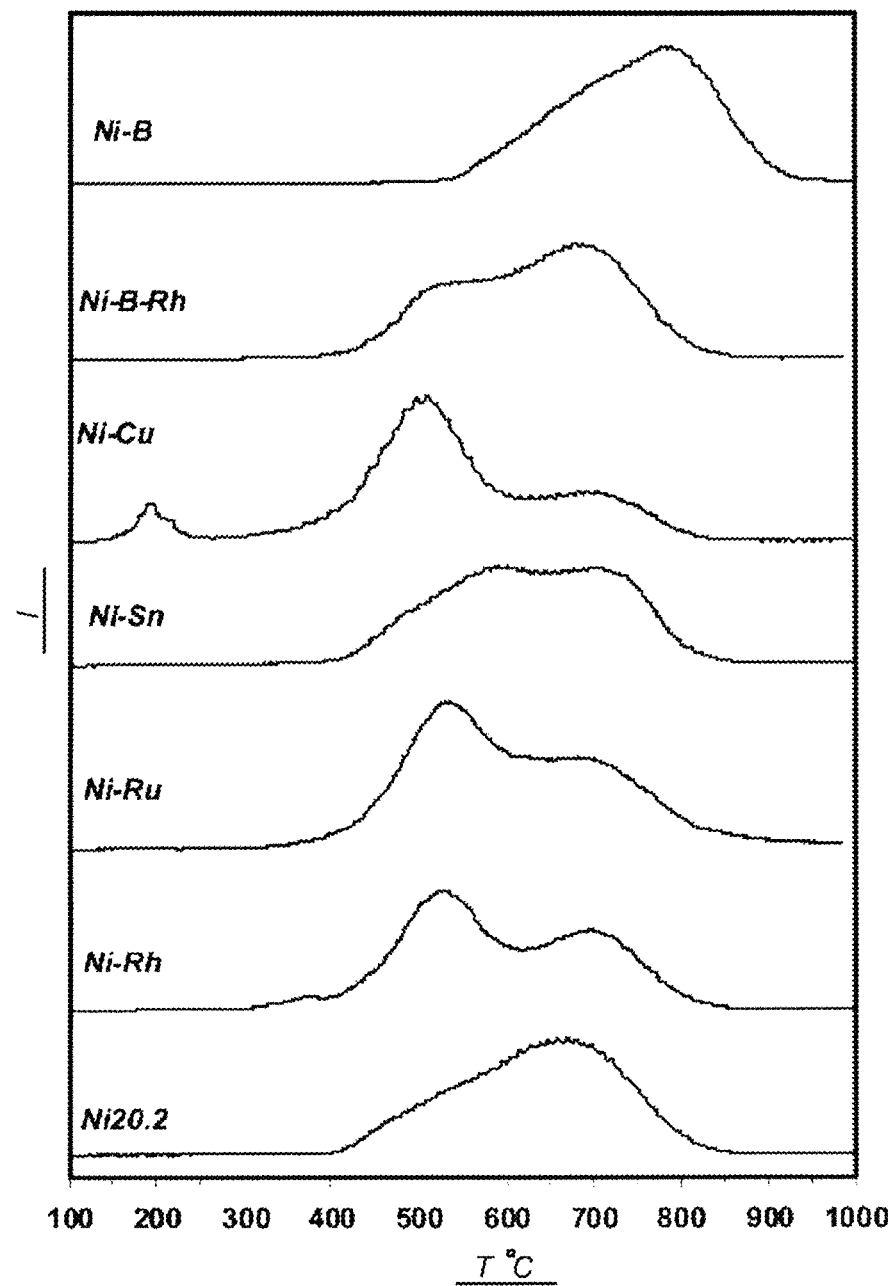
FIG. 4 show some TPR results of nickel catalysts (intensity (a.u.) vs. temperature (° C.)).

FIG. 4 shows the temperature programmed reduction profiles for $MgAl_2O_4$ supported Ni catalyst and Ni-promoter combination catalysts. The two top curves show Ni—B catalysts; the other curves are shown to illustrate the effect of co-doping (but yet in the absence of B). It follows that the presence of the second component next to Nickel shifts the onset of reduction of nickel toward somewhat lower temperature, the extent of the shift changes with promoter. Note that the predominant peak area visible in the FIG. B1 relates to the reduction of nickel species: reduction of the rhodium is apparent in Ni—Rh, the small shoulder at 350° C.; in Ni—Cu, CuO reduction is visible at 200° C. A clear exception, however, is the Ni—B combination catalyst showing its onset of nickel reduction at approximately 600° C. From the intensities of the bands, the reduction must be due to nickel oxide reduction. The higher reduction temperature relates to the smaller Nickel particles in Ni—B catalyst. The high temperature points to a very strong Ni—B interaction. The onset of the reduction of Ni in Ni—B shift however toward lower temperature again with the introduction of a small amount of rhodium in the catalyst. As such, the addition of rhodium (and other precious metals but also base metals) to Ni—B catalysts allows for reductive activation of the Nickel-based catalyst at lower temperatures.

The fraction of metallic Ni after reduction up to 600° C. was determined for some samples, see the Table below. It follows that Ni reduction of the B-promoted catalysts is indeed very difficult; the fraction of reduced Ni participating in steam reforming reaction will be quite small with reduction at 600° C. Some TPR results are summarized in Table 6 below.

TABLE 6

TPR results of the catalysts.

| Catalyst | H$_2$ uptake (mmol/g$_{cat}$) | H$_2$/Ni[1] | % Ni, metal[2] |
|---|---|---|---|
| Ni(18)/MgAl$_2$O$_4$ (comp.) | 2.5 | 0.85 | 50 |
| Ni(18)B(1.2)/MgAl$_2$O$_4$ | 2.4 | 0.8 | 10 |
| Ni(18)Rh(0.35)/MgAl$_2$O$_4$ (comp.) | 2 | 1 | 80 |
| Ni(18)La(10)/MgAl$_2$O$_4$(comp.) | 2.8 | 1 | 75 |

[1] based on Ni loading
[2] fraction of metallic Ni after reduction up to 600° C.;

The rate of conversion can be corrected for the metal dispersion and the fraction of metallic metal in order to make meaningful comparisons. Ni dispersion was determined by TEM analysis. The fraction of metallic Ni as determined by TPR after reduction at 600° C. was used to correct for the amount of non-reduced Ni and calculate an intrinsic activity per surface atom. Some steam reforming rates are summarized in the below table.

TABLE 7

CH$_4$ steam reforming rates Ni, Ni—La, Ni—B and Ni—Rh catalysts. The initial rate is defined as the average rate between 0.5-3 h of reforming at steam/methane of 3 at 600° C.

| catalyst | (Mol CH$_4$/mol Ni$_{surface}$·S) |
|---|---|
| Ni—MgAl$_2$O$_4$ (comp.) | 9 |
| Ni(18)B(1.2)/MgAl$_2$O$_4$ | 50 |
| Ni(18)Rh(0.4)/MgAl$_2$O$_4$ (comp.) | 10 |
| Ni(18)La(10)/MgAl$_2$O$_4$ (comp.) | 8.5 |

The B-promoted catalyst exhibit a much higher intrinsic activity. B promotion indeed results in a much higher reactivity of the Ni surface atoms. The intrinsic activity of the Rh-promoted catalysts is similar to the non-promoted Ni catalysts. This strongly suggests that the Rh promoter is not involved in the reaction other than influencing the dispersion and reduction degree of the Ni phase.

Table 8 shows the conversion activity of Ni—B and Ni—B—Rh and Ni—B—Cu catalysts in methane steam reforming after reduction at various temperatures. In accordance with the higher onset of reductive activation shown in FIG. 4 for Ni—B catalyst, the Ni—B catalyst requires severe reductive treatment to activate compared to the analogous Ni catalyst. Using 40% hydrogen in nitrogen and a dwell period of 5 hours on stream, a reduction temperature of 585° C. was necessary to activate the Ni—B catalyst. This is slightly higher than a similar catalyst with only nickel. The Ni—B—Rh—MgAl$_2$O$_4$ catalyst activates much easier and as result the conversion activity after reduction at 500° C. is similar to the conversion activity of the Ni—B catalyst after reduction at 605° C. The Ni—B—Rh—MgAl$_2$O$_4$ still benefits of somewhat higher reduction of 530° C. (i.e. the conversion activity increases compared to the situation after reduction at 500° C.), while reduction temperatures higher than 530° C. do not induce additional conversion activity. Clearly, the reduction temperature of 530° C. suffices to completely reduce all active nickel in Ni—B—Rh—MgAl$_2$O$_4$ catalyst. Addition of Cu, to produce Ni(18)B(1.2)Cu(2), is also shown in the table to improve the reductive activation to some extent.

TABLE 8

Conversion activity of methane in steam reforming with 7.5% CH$_4$, 22.5% H$_2$O. MgAl$_2$O$_4$ supported Ni—B and (other) promoter. SV = 900,000 h$^{-1}$

| | Catalyst | | | | | | | | |
|---|---|---|---|---|---|---|---|---|---|
| | Ni(18)B(1.2) T$_{red}$ ° C. | | | Ni(18)B(1.2)Rh(0.4) T$_{red}$ ° C. | | | | | Ni(18)B(1.2)Cu(2) T$_{red}$ ° C. |
| | 560 | 585 | 605 | 500 | 530 | 560 | 585 | 605 | 585 |
| | | | | CH$_4$ conversion (%) | | | | | |
| 440 | 0 | 2 | 6 | 6 | 31 | 30 | 31 | 31 | 4 |
| 480 | 0 | 22 | 48 | 47 | 52 | 54 | 53 | 53 | 39 |
| 520 | 0 | 51 | 70 | 69 | 70 | 70 | 70 | 70 | 70 |
| 560 | 0 | 80 | 86 | 85 | 85 | 85 | 85 | 85 | 85 |
| 600 | 8 | 92 | 92 | 92 | 92 | 92 | 92 | 92 | 92 |

In summary, B is an excellent structural promoter for obtaining small Ni particles. A boron promoter has a very favourable influence on the Ni particle size and its stability to steam methane reforming. Despite the inhibition of Ni reduction by B, B-promoted Ni catalysts show similar weight-based reaction rates as a standard Ni catalyst of similar dispersion but with improved stability. Moreover, the rate of reaction of Ni—B catalyst is further improved by increasing the participation of reduced nickel metal which can be achieved by the addition of precious or base metals.

The invention claimed is:

1. A porous catalyst having an average pore size between 0.1-50 nm and comprising: (a) aluminium oxide, (b) a metal oxide selected from magnesium oxide, calcium oxide, titanium oxide, chromium oxide, iron oxide, manganese oxide and zirconium oxide, (c) boron and (d) 4-70 wt. % nickel.

2. The catalyst according to claim 1, wherein the metal oxide is selected from magnesium oxide, calcium oxide and titanium oxide.

3. The catalyst according to claim 2, wherein the metal oxide comprises magnesium oxide.

4. The catalyst according to claim 2, comprising MgAl$_2$O$_4$.

5. The catalyst according to claim 1, wherein the average pore size is in the range of 4-30 nm.

6. The catalyst according to claim 1, comprising 15-45 wt. % of Ni and 0.5-5 wt. % of B.

7. The catalyst according to claim 1, further comprising one or more elements selected from the group consisting of Li, Na, K, Rb, Cs, Be, Sr, Ba, Sc, Y, La, Ce, Pr, Nd, Sm, Eu, Gd, Tb, Dy, Ho, Er, Tm, Yb, Hf, V, Nb, Ta, Mo, W, Re, Ru, Os, Co, Rh, Pd, Ir, Pt, Cu, Ge and Sn.

8. The catalyst according to claim 7, comprising Rh, Ru, Pd, Ir or Pt.

9. The catalyst according to claim 8, comprising Rh in a proportion of 0.01-4 wt. % of the catalyst.

10. The catalyst according to claim 1, further comprising one or more of La, Cu, Sn and Fe.

11. The catalyst according to claim 1, having Ni particles with a diameter in the range of 0.1-50 nm, when subjected to reducing conditions.

12. The catalyst according to claim 11, wherein the Ni particles have a diameter of 4-30 nm.

13. A process for the production of a porous catalyst according to claim 1, comprising:
  (a) combining a first compound of aluminium with a second compound of a metal selected from Mg, Ca, Ti, Zr, Cr, Mn and Fe, and a pore former, and subjecting the combination to crystallisation conditions to provide a porous material;
  (b) ensuring that a nickel compound and a boron compound are present in the formation process or adding a nickel compound and a boron compound to the porous material, and (c) calcining the porous material.

14. The process according to claim 13, wherein the second compound comprises magnesium and the magnesium compound comprises a soluble magnesium salt, wherein the first compound comprises an organo-aluminium compound, wherein the nickel compound comprises a soluble nickel salt, wherein the boron compound comprises a borate salt or especially boric acid and wherein the pore former comprises a triblock copolymer having a molecular weight in the range of 3,000-18,000 Da.

15. A process for the production of hydrogen comprising subjecting a hydrocarbon-containing gas to a steam reforming reaction in the presence of a reforming catalyst in a reaction chamber, wherein the reforming catalyst is a porous catalyst according to claim 1.

16. The process according to claim 15, wherein prior to subjecting a hydrocarbon-containing gas to the reforming reaction in the reaction chamber, the porous catalyst is subjected to reducing conditions, and the Ni particles thus obtained have particle dimensions in the range of 0.1-50 nm.

17. The process according to claim 15, wherein at least part of a predetermined reaction product is selectively removed from the reaction chamber through a separator, which is selectively permeable for said reaction product.

18. The process according to claim 17, wherein the hydrocarbon-containing gas is subjected to the reforming reaction at a temperature in the range of 400-750° C.

19. The process according to claim 18, wherein the hydrocarbon-containing gas is subjected to the reforming reaction at a temperature in the range of 500-700° C.

20. The process according to claim 17, wherein $H_2$ or $CO_2$ is selectively removed from the reaction chamber through a membrane, which is selectively permeable for said $H_2$ or $CO_2$.

21. The process according to claim 15, wherein the hydrocarbon-containing gas comprises $CH_4$.

22. The process according to claim 15, wherein the porous catalyst further comprises a noble metal.

23. The catalyst according to claim 1, comprising 15-45 wt. % Ni.

* * * * *